(No Model.)
J. DAIN, Jr.
CORN HARVESTER.
No. 458,709. Patented Sept. 1, 1891.
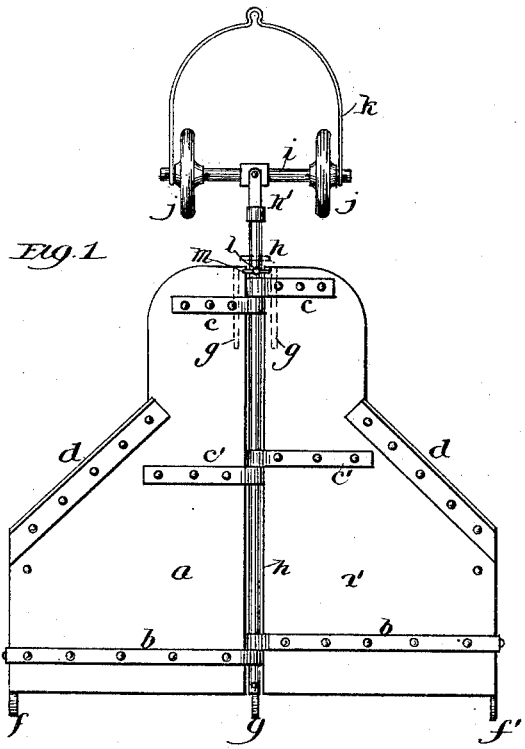
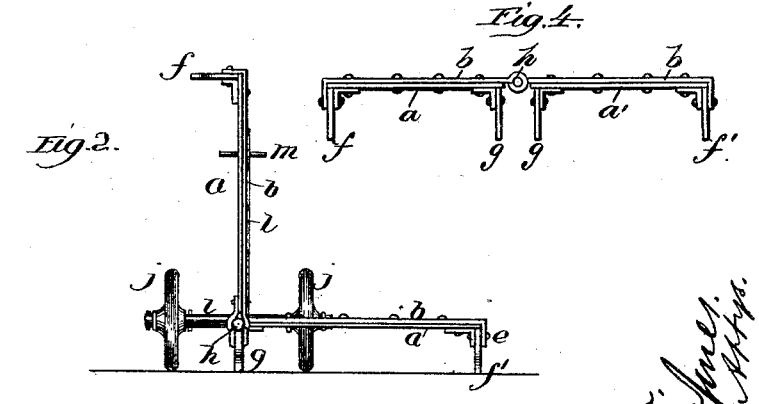
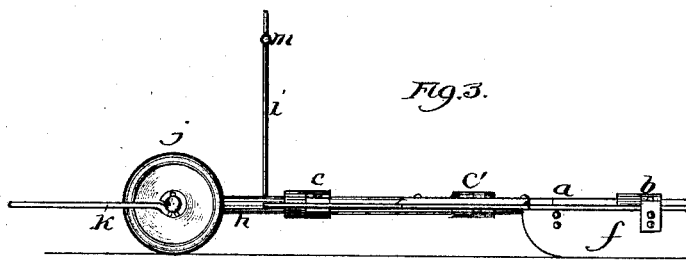

UNITED STATES PATENT OFFICE.

JOSEPH DAIN, JR., OF CARROLLTON, MISSOURI, ASSIGNOR TO THE DAIN MANUFACTURING COMPANY, OF SAME PLACE.

CORN-HARVESTER.

SPECIFICATION forming part of Letters Patent No. 458,709, dated September 1, 1891.

Application filed January 16, 1891. Serial No. 378,041. (No model.)

*To all whom it may concern:*

Be it known that I, JOSEPH DAIN, Jr., a citizen of the United States, residing at Carrollton, in the county of Carroll and State of Missouri, have invented certain new and useful Improvements in Corn-Harvesters, of which the following is a specification, reference being had to the accompanying drawings, in which—

Figure 1 is a top or plan view. Fig. 2 is an end view with one side elevated. Fig. 3 is a side elevation, and Fig. 4 is an end elevation showing a modification.

The object of this invention is to provide a corn-harvester which is simple and strong in its construction, efficient in operation, durable, and cheap. I attain these objects in the manner hereinafter described. That which I deem to be new is pointed out in the claims.

In the drawings, $a\ a'$ indicate the two sections of which the harvester is composed; $b\ c\ c'$, hinge-straps; $d$, blades or cutters; $e$, angle-plates for attaching the runners $f$; $f f'\ g$, runners; $h$, hinge-rod; $h'$, draw-head on hinge-rod; $i\ j$, axle and wheels; $k$, draft-bail; $l$, a vertical staff or bar, and $m$ a short cross-bar near its top.

The sections or platforms $a\ a'$ are made alike, and they are best made of sheet-steel in the form shown, as in this form they can be cut with very little waste. The hinge-straps $b\ c\ c'$ are riveted thereto, as shown, and these hinge-straps may be carried around on the under side to the same length as they are on the upper side, except the straps $b$, which will be bent to form an angular support on the inside of the runner corresponding to the angular support $e$ at the outside, which will give the runner a stronger attachment to the plate.

The cutting-blade $d$ is attached to the inclined portion of the platform $a$ by rivets or bolts, as shown, and the platform may be reenforced at this point by a bar below, through which the bolts or rivets pass. This, however, will not be necessary if the knives are made of strong steel. The knives may have smooth edges, as shown, serrated, or sickle edges, as may be desired. The hinge-rod $h$ is best made of gas-pipe of any desired diameter, one-and-one-fourth-inch pipe being the size usually employed. This rod passes through the hinge-straps, so as to complete the hinges and hold and support the inner sides of the sections, which are thereby made flexible, so that the machine can conform to the surface of the ground over which it is traveling and be folded up, as shown for one section in Fig. 2, or one section may be folded over onto the other. The rear end of the hinge-bar is provided with a runner $g$, which runner in the form shown supports the inner sides of both sections of the platform when in an operative position and entirely supports the sections when both are folded into the position shown at $a$ in Fig. 2. One or both sections may be held in a vertical position by being held against a staff or bar $l$ when clamped together, or held singly by a clamp, dog, or other suitable means. The staff furnishes convenient attachment for holding the lines. It is passed through a hole in the hinge-rod and is not permanently attached, so that it can at any time be withdrawn when it is desired to fold one section onto the other. The hinge-rod is provided with a forked draw-head $h'$, by which it is pivotally attached to the axle $i$ at the middle. Two wheels $j$ are attached to this axle, so as to provide a swiveling truck for turning the machine, and, as shown, the draft-bail $k$ is attached to the ends of the axle outside of the wheels; but it may be connected inside by encircling the axle or by eyebolts.

The runners $f f'$ are attached to the outer edges of the sections $a\ a'$ by angle-irons $e$, which may be formed as a part of the hinge-straps $b$, or they may be separately formed and separate angle-irons may be applied at the front ends of said runners, so as to hold them firmly in place. The runner $g$ is firmly attached to the rear end of the draft-rod $h$, as shown in Fig. 2. It is not essential that the runner $g$ be attached to the draft-rod, as by using two instead of one they may be attached to the inner edges of the platform-sections, as in Fig. 4; but when so made the machine can only properly be folded for transportation purposes by folding one section on top of the other, and it will also be evident that additional runners can be placed at the inner edges of the sections at the front end of the machine, as in dotted lines, Fig. 1, to take the place of the truck $i\ j$, in which case the bar *l* will be placed a little farther forward, as in dotted lines, Fig. 1, so that either section may be folded onto the other, and the team will be attached directly to the draw-head *h'* or to the sections *a a'*. It is obvious that if the runners are arranged at the inner edges of the sections, as in dotted lines, Fig. 1, such runners could extend the full length of the sections.

In operation, when cutting two rows of corn, two persons stand on the platforms just in rear of the blades, who grasp the corn at the time or about the time it is severed by the cutting-blades and hold it until several hills of corn have been cut, when the machine is stopped and the cut corn taken off to form a shock or a part of a shock of cut corn.

By this construction and arrangement I produce a low-down corn-harvester which is flexible in its movements, simple in its construction, and efficient in operation, and I do not limit the use of my other improvements to a machine having a truck in front, while I prefer this form and claim the truck as a part of one of my new and improved combinations, and as the sections are supported from the ground at their outer edges it is evident that a V-shaped blade or cutter may be used or a single one inclined inwardly, instead of outwardly, as shown. By extending the sections beyond the row or rows of corn to be cut and placing runners at their outer sides or edges I give to each section separately a strong support, which adds to its steadiness and to the efficiency of the harvester.

That which I claim as new, and desire to secure by Letters Patent, is—

1. A corn-harvesting machine composed of two similar sections hinged together along the middle line and separately supported on runners, substantially as specified.

2. The combination of the sections *a a'*, having fixed cutting-blades, with the hinge-rod *h* and runners *f f' g*, substantially as described.

3. The combination of the sections *a a'*, having cutters supported upon runners, with the centrally-arranged draft-rod *h h'*, to which both sections are pivotally connected, and truck *i j*, substantially as set forth.

JOSEPH DAIN, JR.

Witnesses:
ALBERT H. ADAMS,
JOHN L. JACKSON.